United States Patent [19]

Sekimura et al.

[11] Patent Number: 4,744,637
[45] Date of Patent: May 17, 1988

[54] LIQUID CRYSTAL DEVICE WITH A PROTECTIVE LAYER OF A PARTICULAR COEFFICIENT OF EXPANSION

[75] Inventors: Nobuyuki Sekimura, Kawasaki; Masaru Kamio, Atsugi; Eiji Sakamoto, Hiratsuka; Taiko Motoi, Sagamihara, all of Japan

[73] Assignee: Canon Kabushiki Kaisha, Tokyo, Japan

[21] Appl. No.: 783,429

[22] Filed: Oct. 3, 1985

[30] Foreign Application Priority Data

Oct. 5, 1984 [JP] Japan ................... 59-207990
Sep. 14, 1985 [JP] Japan ................... 60-203994

[51] Int. Cl.$^4$ ............................................. G02F 1/133
[52] U.S. Cl. ............................. 350/339 R; 350/339 F
[58] Field of Search ............... 350/334, 339 R, 339 F, 350/336

[56] References Cited

U.S. PATENT DOCUMENTS

| | | | |
|---|---|---|---|
| 2,137,397 | 10/1984 | Watanabe | 350/339 F |
| 4,050,786 | 9/1977 | Feldman | 350/336 X |
| 4,501,471 | 2/1985 | Culley et al. | 350/339 R |
| 4,560,241 | 12/1985 | Stolou et al. | 350/339 F |
| 4,561,726 | 12/1985 | Goodby et al. | 350/339 R X |
| 4,597,637 | 7/1986 | Ohta | 350/339 R |
| 4,641,924 | 2/1987 | Nagae et al. | 350/339 R |

OTHER PUBLICATIONS

Jacobs, *Fundamentals of Optical Engineering*, McGraw Hill Book Co., 1943, pp. 98–107.
Goodman "Liquid Crystal Displays" J. Vac. Sci. Tech., vol. 10, No. 5, Sep./Oct. 1973, pp. 804–823.
Fisher "Progress Toward TFT-Addressed TNLC Flat Panel Color Television" *Nonemissive Electrooptic Displays* ed. Kmetz et al., pp. 342–348, 1976.

*Primary Examiner*—Stanley D. Miller
*Assistant Examiner*—David Lewis
*Attorney, Agent, or Firm*—Fitzpatrick, Cella, Harper & Scinto

[57] ABSTRACT

A liquid crystal device comprising a pair of substrates and a liquid crystal disposed therebetween. At least one of the substrates has a color filter layer, a protective layer and a transparent electrode formed in the order named thereon. The protective layer has a coefficient of linear expansion 0.01 to 6 times that of the transparent electrode.

18 Claims, 2 Drawing Sheets

B : BLUE
G : GREEN
R : RED

LIQUID CRYSTAL DEVICE WITH A PROTECTIVE LAYER OF A PARTICULAR COEFFICIENT OF EXPANSION

FIELD OF THE INVENTION AND RELATED ART

This invention relates to a liquid crystal device for a color display apparatus and, more particularly, to a liquid crystal device with a color filter layer.

A prior art liquid crystal device for a liquid crystal color display apparatus, comprises a plurality of picture elements constituted by opposite electrode portions of matrix electrode patterns and a liquid crystal disposed between the opposite electrodes and a layer of color filters each provided for each of the picture elements. The color filter layer is usually provided between the electrodes constituting the picture elements and a substrate. The color filter layer comprises blue (B) filters, green (G) filters and red (R) filters arranged in the form of stripes or in a mosaic form and each being provided for each of the picture elements. The picture elements are selectively driven through optical switching to obtain a desired color image display or color graphic display.

In an active matrix liquid crystal device where a field-effect transistor such as a thin film transistor is provided for each picture element, a color filter layer is provided for each picture element constituted by each thin film transistor provided on a substrate and facing a counter substrate. The color filter layer is provided between electrode and substrate.

In such a prior art liquid crystal device for a color display apparatus, the light transmittance of a picture element is low when it is optically open. Therefore, the color display apparatus requires a high brightness backlight.

In addition, since the prior art color display apparatus uses a high brightness backlight, the color filter layer is subject to early fading of color to shorten the life of the liquid crystal device. To solve this problem, the prior art color display apparatus is provided with an ultraviolet cut filter on the light source side of the liquid crystal device. Such an ultraviolet cut filter, however, increases the number of components and also increases the occurrence of troubles in manufacture.

SUMMARY OF THE INVENTION

We have conducted extensive researches and investigations in connection of the above problems. As a result, we have found that non-uniformity such as roughness or undulation of the surface of the protective layer of a photosetting resin or the like, which is provided for protecting the color filter layer constituting a color picture element against corona discharge at the time of the spattering of ITO (indium tin oxide) for the formation of an ITO film as a transparent electrode, stems from the heating at the time of the spattering, and the transmittance of the picture element when placed in the optically open state is reduced by this non-uniformity of the surface.

An object of the invention, accordingly, is to provide a liquid crystal device, which has high color picture elements of a high transmittance.

Another object of the invention is to provide a liquid crystal device which has color picture elements improved in resistance to deterioration by ultra-violet radiation.

According to the present invention, there is provided a liquid crystal device comprising a pair of substrates and a liquid crystal disposed therebetween, at least one of the substrates having a color filter layer, a protective layer and a transparent electrode formed in the order named thereon, the protective layer having a coefficient of linear expansion 0.01 to 6 times that of the transparent electrode.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1A:
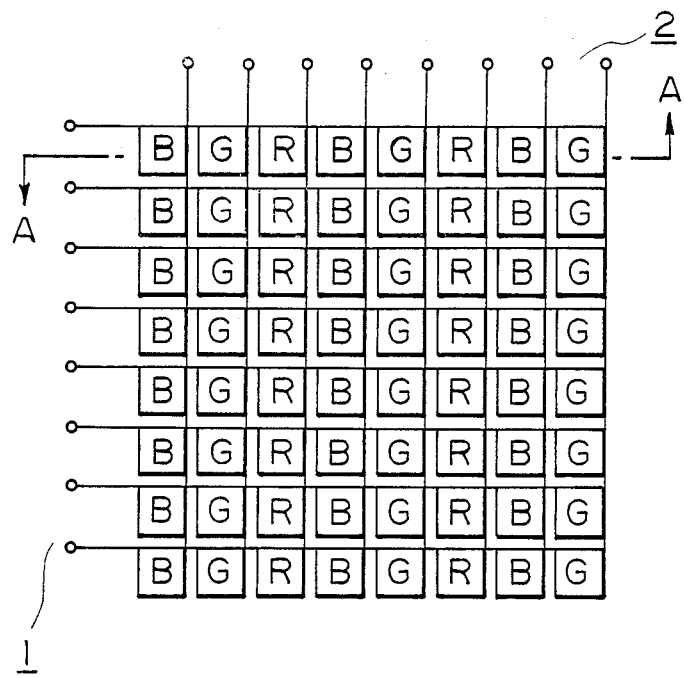
FIG. 1A is a schematic plan view showing a liquid crystal device according to the invention.
Figure 1B:
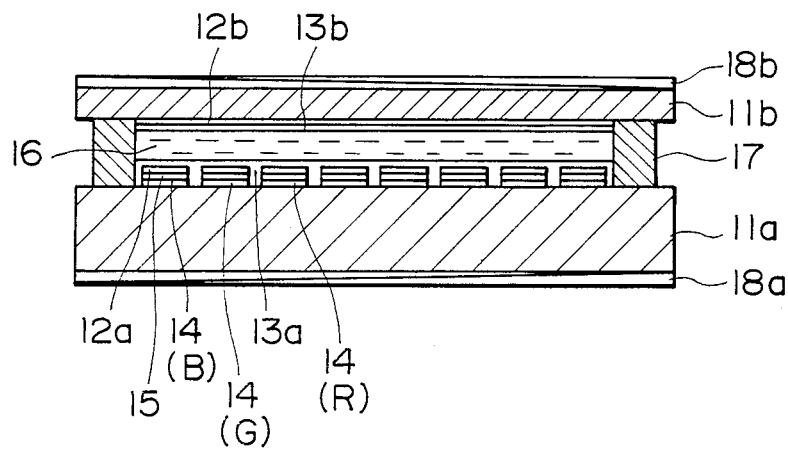
FIG. 1B is a sectional view taken along line A—A in FIG. 1A.

FIGS. 1A and 1B illustrate an embodiment of the liquid crystal device for a color display apparatus. FIG. 1A is a plan view and FIG. 1B is a sectional view. In the illustrated liquid crystal device, color filters B, G and R are arranged in the form of stripes for individual picture elements. A scanning signal is sequentially applied to scanning lines 1 while a display signal, e.g., information signal or video signal, is applied to display lines 2 in synchronism with the scanning signal, whereby a color display is obtained.

In the liquid crystal device according to the invention, a liquid crystal 16 is disposed between a pair of substrates or base plates 11a and 11b (e.g., glass plates or plastic films). The substrate 11a is provided with transparent electrodes 12a (of ITO, for instance) in the form of stripes serving as the display lines 2, while the substrate 11b is provided with transparent electrodes 12b (of ITO, for instance) in the form of stripes serving as the scanning lines 1. According to the invention, a color filter layer 14 constituting the B, G or R color filter is provided for each picture element on the substrate 11a, and each of the above mentioned transparent electrodes 12a is formed above the color filter layer 14 via a protective layer 15.

The protective layer 15 may be formed of a material having a coefficient of linear expansion (hereinafter referred to as "$\alpha$") of 0.01 to 6 times, preferably 0.01 to 5 times, most preferably 0.05 to 5 times the coefficient of linear expansion of the transparent electrode 12a. Specific examples of the suited material include insulating inorganic materials such as $SiO_2$ ($\alpha$: $6 \times 10^{-7}/°C$.), $TiO_2$ ($\alpha$: $9 \times 10^{-7}/°C$.) and glass ($\alpha$: 45 to $100 \times 10^{-7}/°C$.) and thermosetting resins such as acrylic thermosetting resins ($\alpha$: 200 to $300 \times 10^{-7}/°C$.) epoxy thermosetting resins ($\alpha$: 200 to $400 \times 10^{-7}/°C$.), silicone resins ($\alpha$: 200 to $500 \times 10^{-7}/°C$.) and polyimide resins ($\alpha$: 400 to $500 \times 10^{-7}/°C$.). The linear expansion coefficients $\alpha$ of the above materials are based on values measured with respect to a specimen in conformity with JIS (Japan Industrial Standard) K6714. After synthetic resins including other types of setting or curable resins, e.g.

those setting on exposure to actinic radiation, and thermoplastic resins such as a styrene-methyl methacrylate resin may also be used as far as they provide a film with a prescribed coefficient of linear expansion. The protective layer may be formed in a thickness of, e.g., 500 Å to 3$\mu$, preferably 1000 Å to 2 $\mu$.

The transparent electrode 12a used in the invention may suitably comprises ITO (with a linear expansion coefficient generally ranging from 80 to 100×10$^{-7}$/°C. depending on the ratio between indium and tin). Further, indium oxide (with a linear expansion coefficient of approximately 100×10$^{-7}$/°C.) and tin oxide (with a linear expansion coefficient of approximately 40×10$^{-7}$/°C.) may also be used for the transparent electrode. The transparent electrode may be formed in a thickness of, e.g., 200 Å to 2000 Å, preferably 300 Å to 1200 Å.

According to the invention, roughening or undulation of the protective layer 15 caused by heating at 200° C. or above at the time of sputtering can be prevented by setting the linear expansion coefficient of the protective layer 15 noted above to 0.01 to 6 times that of the transparent electrode to be formed by sputtering on the protective layer 15 as will be made clear in the examples given hereinafter. The reason for this has not been fully clarified as yet. However, it is conjectured that if the protective layer 15 has more than six times as large linear expansion coefficient as that of the transparent electrode, as an ITO film is formed under heating on the protective layer 15 followed by quick cooling, the protective layer 15 undergoes quick shrinkage to a greater extent than the ITO film and this shrinking force causes the roughening or undulation of the protective layer 15. Therefore, it is supposed that the roughening or undulation of the protective layer 15 can be prevented by optimizing the linear expansion coefficient of the protective layer 15.

The R, G and B color filter layers 14 may be formed as a deposition layer of a pigment or a dye or be formed as a film of a resinous binder containing a pigment or dye, e.g., in a thickness of 2000 Å to 1$\mu$, preferably 3000 Å to 5000 Å.

On the transparent electrodes 12a and 12b are respectively formed orientation control films 13a and 13b having an unidirectional orientation axis provided by a uniaxial orientation treatment such as rubbing. The orientation control films 13a and 13b are made of such materials as polyimide, polyesterimide, polyamideimide, polyamide and polyvinyl alcohol. According to the invention, polyimide is most suitably used for the orientation control film 13a for the purpose of preventing the fading of the color of the color filter layer 14 due to ultraviolet rays. Particularly, by setting the thickness of the polyimide film of 0.5 $\mu$m or above, it is possible to cut or interrupt more than 50% of ultraviolet rays (with wavelengths of 350 nm or below). As a solvent for a polyamic acid resin component which is a precursor of polyimide, N-methylpyrrolidone, for instance, is used. When this solvent is coated directly on the color filter layer, however, elution of the color filter layer can be caused by the solvent. In the present invention, the elution can be effectively prevented by forming the transparent electrode 12a on the color filter layer.

The liquid crystal 16 used in the liquid crystal device according to the invention may be selected from various liquid crystals. However, twisted nematic (TN) liquid crystals and ferroelectric liquid crystals are particularly suited. Further, in case of a ferroelectric liquid crsytal, it is suitably placed in a bistable state. A ferroelectric liquid crystal in chiral smectic C phase (SmC*), H phase (SmH*), I phase (SmI*), K phase (SmK*) or G phase (SmG*) of a nonspiral structure or texture may suitably be used. With a ferroelectric liquid crystal under the bistable state, the maximum light transmittance and light-interruption are obtained under cross nicols when one half of the angle between first and second stable states, i.e., the tilt angle, is 22.5°. In practice, however, such a tilt angle is usually 5° to 15°. Besides, the light transmittance is reduced by the protective layer formed on the color filter layer as mentioned before. Therefore, where color filter layers are provided in a liquid crystal device using a ferroelectric liquid crystal in the bistable state, the light transmittance is extremely reduced, so that satisfactory color pattern display cannot be obtained unless a backlight of a considerably high brightness is used.

According to the invention, it is also possible to solve this problem through control of the linear expansion coefficients of the transparent electrode and the protective layer for the color filter layer in the manner as described above.

Figure 2:
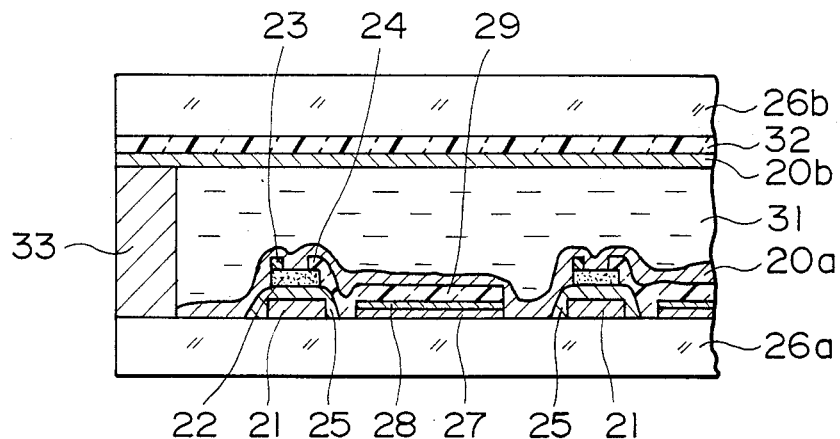
FIGS. 2 and 3 are sectional views showing different embodiments of the liquid drystal device according to the invention.

FIG. 2 is a sectional view showing another embodiment of the invention. In this instance, thin film transistors (TFT) are provided as driver elements in a matrix arrangement at a density of 2 to 10 TFTs/mm on a substrate (of glass or like) 26a constituting a display panel. Each TFT comprises a gate line (of a transparent or metallic thin film conductive film) formed on the substrate 26a, a gate electrode 21 formed on the gate line, a thin film semiconductor 22 formed above the gate electrode 21 via an insulating film 25, a source line (composed of a conductive film) formed contiguous to the source electrode 23 and a drain electrode 24. The drain electrode 24 constitutes a transparent electrode 29 serving as a unit display element. A color filter layer 27 and a protective layer 28 formed thereon are provided on the substrate 26a at a position corresponding to the transparent electrode 29. In this example, the linear expansion coefficient of the protective layer 28 is set to 0.01 to 6 times, preferably 0.01 to 5 times, most preferably 0.05 to 5 times, the linear expansion coefficient of the transparent electrode 29 as noted before. A polyimide orientation or alignment controlling film 20a having a unidirectional orientation axis is formed on the transparent electrode 29. A liquid crystal 31 is disposed between the TFT substrate 26a and counter substrate 26a facing the substrate 26a. A counter electrode 32 covered by a polyimide orientation control film 20b is provided on the counter substrate 26b. A sealing material 33 is provided along the edges of the TFT substrate 26a and counter substrate 26a to seal in the liquid crystal 41.

Figure 3:
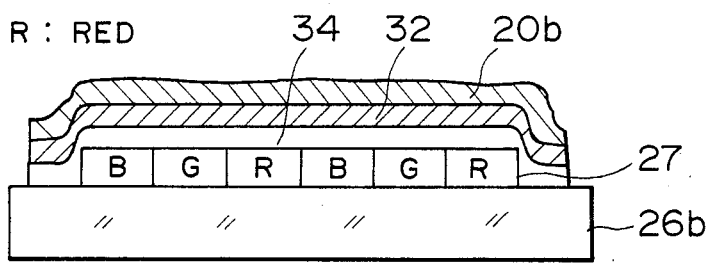

FIG. 3 shows an embodiment, in which a color filter layer 27 as used in the liquid crystal device shown in FIG. 2 is provided on the counter substrate 26b. In this case, like the case of the liquid crystal device shown in FIG. 2, a protective layer 34 is disposed between the color filter layer 27 and the transparent electrode 32. Furthermore, the color filter layer 27 is disposed so as to correspond in position to the transparent electrode 29 on the substrate 26a as shown in FIG. 2. A polyimide film 20a is further formed on the transparent electrode 32.

According to the invention, the transmittance of color filters can be improved, and also the following effects can be obtained.

1. The polyimide resin film as an orientation material plays the role of an ultraviolet cut filter, thus improving the light resistance of the color filter consisting of colorant layers and also preventing the fading deterioration of the display device.

2. The entire device can be made thinner as an additional ultraviolet cut filter need not be provided outside the device.

3. The transparent electrode layer formed on the color filter also serves as a protective layer for the color filter, so that there is no need of providing an insulating film between polyimide resin and color filter. Thus, the number of steps for manufacture can be reduced.

Now, examples of the invention will be given.

EXAMPLE 1

Positive resist (provided by Tokyo Oka K. K. under a trade name "OFPR 800") was coated by spinner coating to a thickness of 5000 to 7000 Å on a picture element electrode on a glass plate ("7059" of Corning). The resist was then prebaked at 90° C. for 30 minutes and then subjected to mask exposure to ultraviolet light. The coated plate was then immersed in a prescribed developing liquid for one minute and then in a prescribed rinsing liquid for one minute, thereby forming a resist mask. Then, the entire surface of the electrode plate with the resist mask was exposed to render the mask resist soluble in a solvent. The photosensor array was then placed a vacuum vessel in which a Mo boat containing copper phthalocyanine was also placed. The Mo boat was heated to 450° to 550° C. under a vacuum of $10^{-5}$ to $10^{-6}$ Torr to vaporize and deposite copper phthalocyanine to form a film of 4000 Å. Subsequently, the electrode plate was immersed in the prescribed developing liquid which was agitated, thus removing unnecessary portions of the deposited film while dissolving the resist mask. In this way, a patterned blue color filter layer was formed. Thereafter, the OFPR 800 was coated on the electrode plate with the patterned blue color filter layer, followed by exposure and development in the manner as described above. Then, a resist mask was formed corresponding to a patterned green color filter layer to be formed. The electrode plate was then subjected to the entire surface exposure and placed in the vacuum vessel for deposition of lead phthalocyanine at 450° to 550° C. to form a film with a thickness of 3000 Å was obtained. The electrode plate was then immersed in a developing liquid which was agitated, thus obtaining the patterned green color filter layer. Further, a red colorant of perylene tetracarbonate derivative Irgadine Red BPT (available from Ciba Geigy, C.I. No. 71127) was deposited in the manner as described above at 400° to 500° C. to a thickness of approximately 3000 Å, followed by processing using a developing liquid to obtain a patterned red color filter layer.

Then, an $SiO_2$ film was formed by vacuum deposition to a thickness of 2000 Å on the electrode plate with the color filter layers noted above. The $SiO_2$ used for the deposition was found to have a linear expansion coefficient of $6 \times 10^{-7}$/°C. when measured in conformity with JIS K6714. Then, an ITO film with a thickness of 1000 Å was formed on the $SiO_2$ film by sputtering with the substrate temperature set to 250° C. This ITO showed a linear expansion coefficient of $95 \times 10^{-7}$/°C. when measured in conformity with JIS K6714.

The ITO film surface of the ITO/$SiO_2$/glass filter/glass substrate obtained by the above process had neither rough surface nor undulation as a result of measurement using an all-purpose surface shape measurement device "SE-3C" provided by Kosaka Kenkyuso K.K. Further, the light transmittance measured under white light (i.e., average light transmittance with respect to wavelengths of 400 to 600 nm) was 75%.

The ITO film on the substrate produced in the above manner was patterned into the form of stripes, and then a 1000 Å polyimide film was coated (through coating of a 5-% N-methylpyrrolidone solution solution of polyamic acid followed by dehydration ring closure), and its surface was rubbed with cloth in one direction.

As the counter substrate was used one, which was prepared in the same manner as described above except that the $SiO_2$ film and color filter layers were omitted.

Then, a blank cell was prepared by using the thus obtained two substrates with a gap therebetween set to 1.5 μm so that the stripes of the ITO films on these substrates intersected perpendicularly and their rubbing directions were parallel.

P-decyloxybenzylidene-p'-amino-2-methylbutyl cinnamate (DOBAMBC) in the isotropic phase was then injected into the blank cell from an injection port thereof by the vacuum injection process. The inlet was then sealed, and the cell was gradually cooled at a rate of 5° C./hour down to 70° C., whereby a ferroelectric liquid crystal (chiral smectic C phase) showing bistability was obtained.

The thus obtained liquid crystatal device was disposed between a pair of polarizers arranged in cross nicols and driven by applying driving voltages thereto while a 30-watt white fluorescent lamp was placed behind the liquid crystal cell. As a result, a bright color display was obtained.

EXAMPLE 2

A liquid crystal device was produced in the same manner as in Example 1 except that a phenol novalak type epoxy resin and a solvent-free thermosetting adhesive containing tetraethylenepentamine hardener were used to form a protective film in a thickness of 2000 Å in place of the $SiO_2$ film on the color filter substrate for the liquid crystal device of Example 1. Evaluation of this liquid crystal device proved that similar results as in the case of Example 1 were obtained. The linear expansion coefficient of the hardened thermosetting adhesive noted above, measured in the manner as in Example 1, was $480 \times 10^{-7}$/°C.

COMPARATIVE EXAMPLE 1

A liquid crsytal device was produced in the same manner as in Example 1 except that an acrylic photosetting resin (i.e., Photolec RFG available from Sekisui Fine Chemical K.K.) was used to form a film in a thickness of 2000 Å in place of the $SiO_2$ film on the color filter substrate used for the liquid crystal device of Example 1. The light transmittance of the color filter substrate used for preparing the liquid crystal device was measured to be 58%. The ITO film surface was measured with the surface shape measurement device used in Example 1 so that undulation with an average coarseness of approximately 1 μm was observed.

The linear expansion coefficient of the hardened photosetting resin as measured by the same method as in Example 1 was approximately $780 \times 10^{-7}$/°C.

This color filter substrate was used in produce a liquid crystal device in the same manner as in Example 1. A color display obtained by this liquid crystal device was dark compared with that obtained by the device of Example 1.

Further, an ITO film was formed by sputtering at a sputtering temperature lower than 100° C. As a result thereof, the phenomenon of undulation causing reduction of the light transmittance could be eliminated. With such low temperature sputtering, however, the adhesion of the ITO film with the protective layer (i.e., hardened film of photosetting resin) was inferior, so that the device was not suited for use for long time.

Thus, it is to be understood that according to the invention a high temperature sputtering process at 200° C. or above, which ensures excellent adhesion, can be used for producing a color filter substrate for a color liquid crystal device. That is, with this process it is possible to eliminate rough surface or undulation of the color filter substrate surface that results from quick cooling of the substrate from a high temperature.

EXAMPLE 3

A liquid crystal device was produced in the same manner as in Example 1 except that a thermosetting acrylic resin ("FR-3288", available from Mitsubishi Rayon K.K.) was used to form a protective film in a thickness of 2000 Å in place of the $SiO_2$ film on the color filter substrate for the liquid crystal device of Example 1. Evaluation of this liquid crystal device proved that similar results as in the case of Example 1 were obtained. The linear expansion coefficient of the hardened thermosetting acrylic resin noted above, measured in the manner as in Example 1, was $530 \times 10^{-7}/°C$.

COMPARATIVE EXAMPLE 2

A liquid crystal device was produced in the same manner as in Example 1 except that a thermoplastic styrene-methyl methacrylate copolymer resin ("MS200" available from Seitetsu Kagaku K.K.) was used to form a protective film in a thickness of 2000 Å in place of the $SiO_2$ film on the color filter substrate used for the liquid crystal device of Example 1. The light transmittance of the color filter substrate used for preparing the liquid crystal device was measured to be 57%. The ITO film surface was measured with the surface shape measurement device used in Example 1 so that undulation with an average coarseness of approximately 1 μm was observed.

The linear expansion coefficient of the hardened photosetting resin as measured by the same method as in Example 1 was approximately $810 \times 10^{-7}°C$.

What is claimed is:

1. A liquid crystal device comprising a pair of substrates and a liquid crystal disposed therebetween, at least one of the substrates having a resinous color filter layer, a resinous protective layer and a transparent electrode disposed successively in the order named thereon, said protective layer having a coefficient of linear expansion 0.01 to 6 times that of the transparent electrode said protective layer being in contact with said electrode.

2. A liquid crystal device according to claim 1, wherein said protective layer has a coefficient of linear expansion 0.01 to 5 times that of the transparent electrode.

3. A liquid crystal device according to claim 1, wherein said protective layer has a coefficient of linear expansion 0.05 to 5 times that of the transparent electrode.

4. A liquid crystal device according to claim 1, wherein said protective layer comprises a set film of a setting resin.

5. A liquid crystal device according to claim 4, wherein said setting resin is a thermosetting resin.

6. A liquid crystal device according to claim 1, wherein said protective film comprises a film of an insulating inorganic material.

7. A liquid crystal device according to claim 6, wherein said inorganic insulating material is $SiO_2$.

8. A liquid crystal device according to claim 1, wherein said transparent electrode comprises a film of an indium oxide-tin oxide mixture formed by sputtering.

9. A liquid crystal device according to claim 1, wherein said color filter layer comprises a film of a resinous binder containing a pigment or dye.

10. A liquid crystal device according to claim 1, wherein said transparent electrode has a coefficient of linear expansion of $40 \times 10^{-7}/°C$. to $100 \times 10^{-7}/°C$.

11. A liquid crystal device according to claim 1, wherein said protective layer has a coefficient of linear expansion of $2 \times 10^{-7}/°C$. to $6 \times 10^{-5}/°C$.

12. A liquid crystal device according to claim 1, wherein said transparent film is coated with an orientation controlling film having a unidirectional orientation axis with an effect of orienting liquid crystal molecules in one direction.

13. A liquid crystal device according to claim 1, wherein at least one of the substrates has an orientation controlling film covering the transparent electrode.

14. A liquid crystal device according to claim 13, wherein said orientation controlling film is a polyimide film treated by rubbing.

15. A liquid crystal device according to claim 1, wherein said liquid crystal is a ferroelectric liquid crystal material.

16. A liquid crystal device according to claim 15, wherein said ferroelectric liquid crystal placed under bistability condition.

17. A liquid crystal device according to claim 16, wherein said ferroelectric liquid crystal placed under bistability condition is in a chiral smectic phase with a non-spiral texture.

18. A liquid crystal device according to claim 17, wherein said chiral smectic phase is chiral smectic C phase, H phase, J phase, K phase or G phase.

* * * * *